United States Patent
Zhu

(10) Patent No.: US 10,848,586 B2
(45) Date of Patent: Nov. 24, 2020

(54) CONTENT DELIVERY NETWORK (CDN) FOR UPLOADING, CACHING AND DELIVERING USER CONTENT

(71) Applicant: Zhongwen Zhu, Saint-Laurent (CA)

(72) Inventor: Zhongwen Zhu, Saint-Laurent (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/320,617

(22) PCT Filed: Jul. 25, 2016

(86) PCT No.: PCT/IB2016/054429
§ 371 (c)(1),
(2) Date: Jan. 25, 2019

(87) PCT Pub. No.: WO2018/020291
PCT Pub. Date: Feb. 1, 2018

(65) Prior Publication Data
US 2019/0166223 A1    May 30, 2019

(51) Int. Cl.
*H04L 29/08* (2006.01)
*H04W 12/06* (2009.01)
*G06F 9/445* (2018.01)

(52) U.S. Cl.
CPC .......... *H04L 67/2857* (2013.01); *G06F 9/445* (2013.01); *H04L 67/02* (2013.01); *H04L 67/06* (2013.01); *H04L 67/1097* (2013.01); *H04L 67/2842* (2013.01); *H04W 12/06* (2013.01); *H04L 67/26* (2013.01)

(58) Field of Classification Search
CPC ...... H04W 12/06; H04W 4/025; H04L 67/10; H04L 2012/2841; H04L 67/02; H04L 67/06; H04L 67/125; H04L 67/18; H04L 67/2857; H04M 3/42348; H04M 2215/2026
See application file for complete search history.

(56) References Cited

U.S. PATENT DOCUMENTS 6,751,673 B2 *   6/2004   Shaw ................ H04L 29/06027
                                                     709/217
7,133,905 B2 *  11/2006   Dilley .................... H04L 29/06
                                                     709/219

(Continued)

FOREIGN PATENT DOCUMENTS

EP        2 838 239 A1      2/2015
EP        2838239 A1 *      2/2015  ........... H04L 63/102

*Primary Examiner* — Sargon N Nano
(74) *Attorney, Agent, or Firm* — Julie Dufort; Ericsson Canada Inc.

(57) ABSTRACT

The disclosure relates to a system, methods, devices and nodes for managing shared user content. The system comprises a wireless device which is operative to upload the content to be shared to a Content Delivery Network (CDN) Delivery and Caching Node (DCN), which in turn is operative to cache and deliver the shared user content to other wireless devices and network nodes. The system further comprises a CDN management node, operative to manage the storage of the shared user content in the CDN DCN and a network node operative to instruct the wireless device to store the shared user content to the CDN DCN and to retrieve the shared user content from the CDN DCN.

8 Claims, 13 Drawing Sheets

(56) References Cited

U.S. PATENT DOCUMENTS

| | | | | |
|---|---|---|---|---|
| 7,293,093 | B2 * | 11/2007 | Leighton | H04L 29/12009 707/999.01 |
| 7,395,355 | B2 * | 7/2008 | Afergan | H04L 12/66 709/247 |
| 7,596,619 | B2 * | 9/2009 | Leighton | H04L 29/12009 707/999.01 |
| 7,962,580 | B2 * | 6/2011 | Gagliardi | G06F 16/958 709/219 |
| 8,112,471 | B2 * | 2/2012 | Wei | H04L 67/1002 709/202 |
| 8,473,585 | B1 * | 6/2013 | Smith | H04L 67/1097 709/218 |
| 9,532,210 | B2 * | 12/2016 | Hao | H04W 8/22 |
| 9,961,159 | B2 * | 5/2018 | Yellin | H04L 67/2847 |
| 2004/0010621 | A1 * | 1/2004 | Afergan | H04L 12/66 709/247 |
| 2004/0019781 | A1 * | 1/2004 | Chari | H04L 63/1408 713/153 |
| 2010/0299722 | A1 * | 11/2010 | Tewari | H04L 12/14 726/3 |
| 2012/0124631 | A1 | 5/2012 | Xia | |
| 2014/0164584 | A1 * | 6/2014 | Joe | H04L 61/1511 709/223 |
| 2014/0317176 | A1 * | 10/2014 | Luecke | H04L 67/327 709/203 |
| 2014/0325577 | A1 | 10/2014 | Garcia Mendoza et al. | |
| 2015/0052584 | A1 * | 2/2015 | Rudraraju | H04L 63/102 726/4 |
| 2015/0121484 | A1 * | 4/2015 | Liu | G06F 16/9566 726/5 |
| 2015/0169616 | A1 * | 6/2015 | Benraz | G06F 11/3419 714/798 |
| 2015/0371057 | A1 * | 12/2015 | Ow | H04L 63/10 726/28 |
| 2019/0230186 | A1 * | 7/2019 | Yellin | G06F 9/44505 |

* cited by examiner

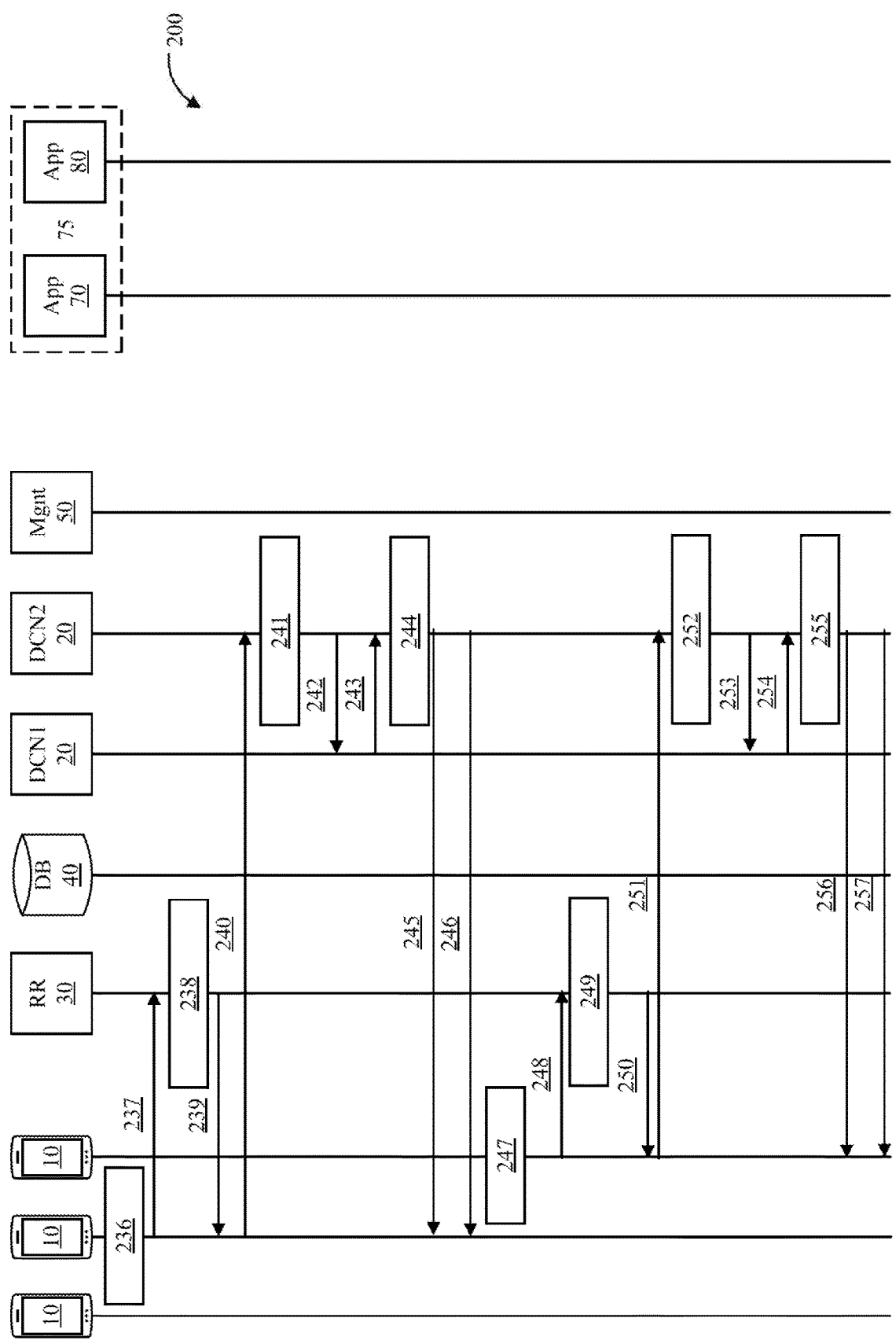

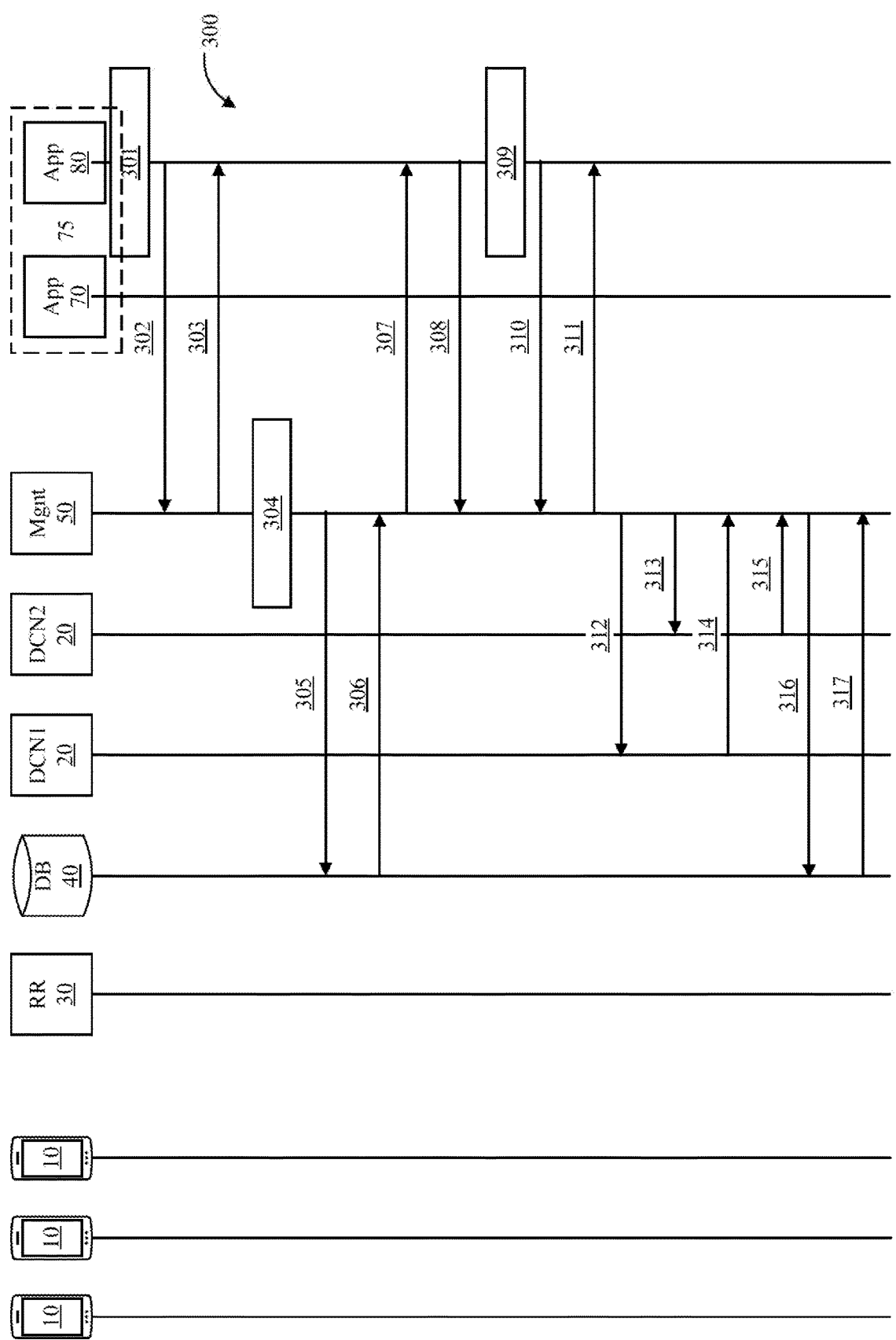

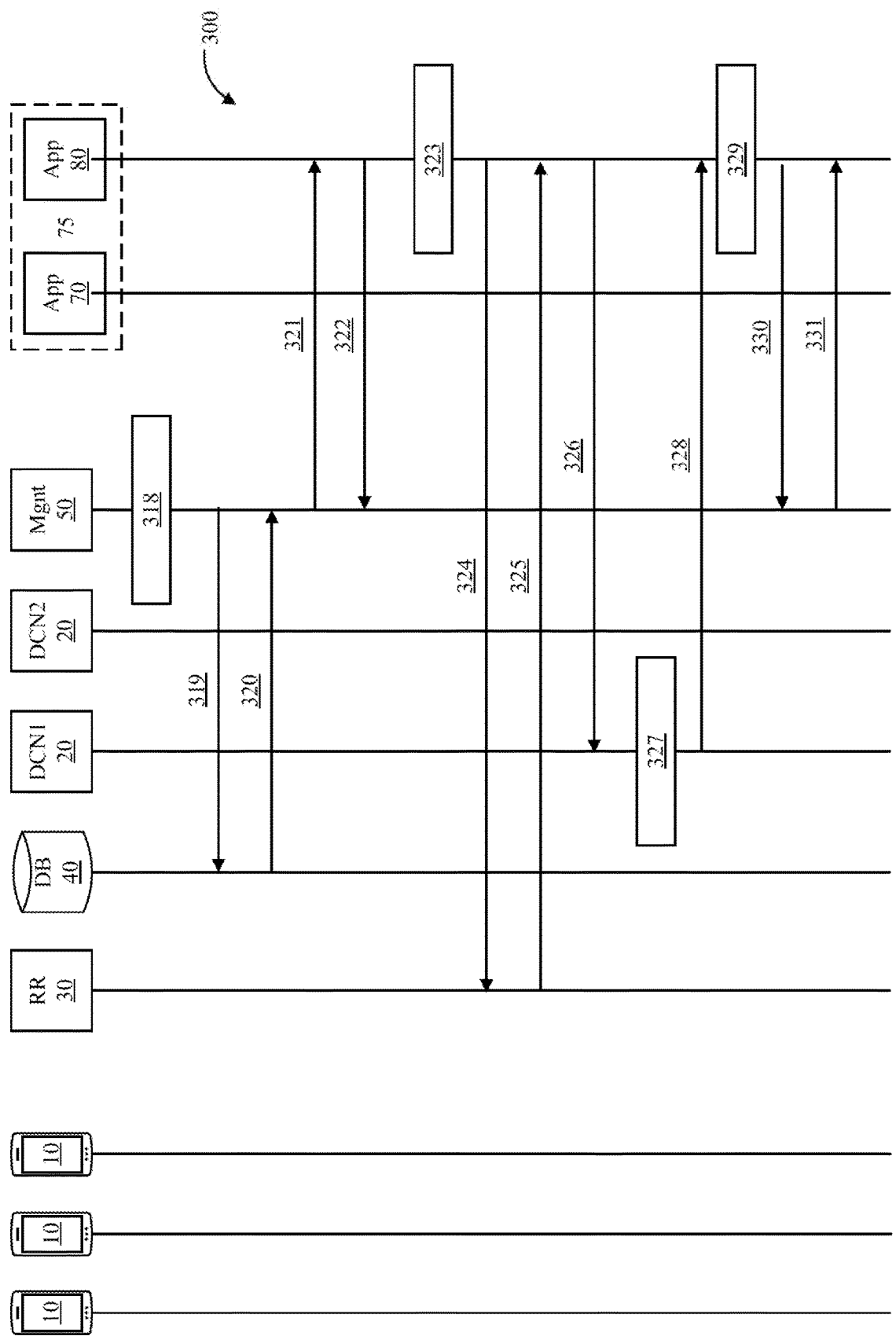

CONTENT DELIVERY NETWORK (CDN) FOR UPLOADING, CACHING AND DELIVERING USER CONTENT

TECHNICAL FIELD

The present disclosure relates to Content Delivery Networks (CDNs) and the management of user content.

BACKGROUND

Content delivery networks (CDNs) are used by content providers (CPs) to provide their content to users for distribution in order to enhance user experience. The CDNs cache content in one or many Delivery and Caching Nodes (DCNs) which are geographically dispersed and organized as a hierarchy e.g. edge, region and core layers which enables the CDN to deliver content to a large number of users. DCNs have the bandwidth and storage capacity for caching content for later delivery. When a user requests content, a DCN is selected for serving the content based on proximity to the user location. Hence, the content consumers have good user experience due to the proximity based content delivery. When the selected DCN does not have a requested content in its cache, it gets it from the origin server (OS) or from another DCN in the hierarchy. The other DCN can be at the same level or at another level of the hierarchy.

One problem with this general setup is that origin servers have a limited capacity and traffic towards it needs to be controlled. CDNs generally solve this problem by trying to minimize traffic towards the origin servers.

Social media applications can be run using a similar setup with an origin server and a CDN for delivering the popular content. In the context of social media, the origin server still has bandwidth limitations. A problem can occur when users provide/upload a lot of content such as pictures and videos.

SUMMARY

There is provided a wireless device (WD) for uploading a user content to be shared to a Content Delivery Network (CDN) Delivery and Caching Node (DCN). The WD comprises a transmitter operative to send a request to a network node for a transfer of the user content to be shared from the WD and a receiver operative to receive a Uniform Resource Locator (URL) from the network node for the user content to be shared. The transmitter is further operative to send the URL to the CDN DCN and to upload the user content to be shared to the CDN DCN and power supply circuitry operative to supply power to the WD.

There is provided a Content Delivery Network (CDN) Delivery and Caching Node (DCN) for caching and delivering a shared user content. The CDN DCN comprises a receiver operative to receive a Uniform Resource Locator (URL) from a Wireless Device (WD) for the shared user content and a transmitter operative to send the URL to a CDN management node for authentication. The receiver is further operative to receive an authentication response from the CDN management node and the receiver is further operative to receive the shared user content corresponding to the URL from the WD. The CDN DCN further comprises a storage operative to cache the shared user content and power supply circuitry operative to supply power to the CDN DCN.

There is provided a network node, operative to instruct a Wireless Device (WD) to store a shared user content to a Content Delivery Network (CDN) Delivery and Caching Node (DCN) and to retrieve the shared user content from the CDN DCN. The network node comprises a receiver operative to receive a request for a transfer of the shared user content from the WD, processing circuitry operative to select a CDN DCN for storing the shared user content, a transmitter operative to send a Uniform Resource Locator (URL) for the shared user content to the WD and power supply circuitry operative to supply power to the network node.

There is provided a Content Delivery Network (CDN) management node, operative to manage storage of shared user content in CDN Delivery and Caching Node (DCN). The CDN management node comprises a receiver operative to receive a request for a Uniform Resource Locator (URL) from a network node, processing circuitry operative to update information relating to an account associated with the network node a transmitter operative to send the URL to the network node. The receiver is further operative to receive the URL from a CDN DCN, the processing circuitry is further operative to authenticate the URL and the transmitter is further operative to send an authentication response to the CDN DCN, the authentication response including a time-to-live (TTL) for the shared user content.

There is provided a system for managing a shared user content. The system comprises the WD as described previously, operative to upload the shared user content to a Content Delivery Network (CDN) Delivery and Caching Node (DCN) as described previously. The CDN DCN is operative to cache and deliver the shared user content. The system comprises the CDN management node as described previously, operative to manage the storage of the shared user content in the CDN DCN and the network node as described previously, operative instruct the WD to store the shared user content to the CDN DCN and to retrieve the shared user content from the CDN DCN.

In the methods described below, some steps may be optional and may or may not be executed or may be executed in a different order.

There is provided a method for uploading a user content to be shared from a Wireless Device (WD) to a Content Delivery Network (CDN) Delivery and Caching Node (DCN). The method is executed by the WD and comprises sending a request to a network node for a transfer of the user content to be shared from the WD, receiving a Uniform Resource Locator (URL) from the network node for the user content to be shared, receiving an address of the CDN DCN, sending the URL to the CDN DCN and to uploading the user content to be shared to the CDN DCN and, using the URL, downloading the shared user content from the CDN DCN.

There is provided a method for caching and delivering a shared user content. The method is executed by the CDN DCN and comprises receiving a Uniform Resource Locator (URL) from a Wireless Device (WD) for the shared user content, sending the URL to a CDN management node for authentication, receiving an authentication response from the CDN management node. The method comprises receiving the shared user content corresponding to the URL from the WD, caching the shared user content, receiving a request from the WD for a second shared user content which is not cached in the CDN DCN, sending a request for the second shared user content to a second CDN DCN and sending the second shared user content to the WD in response to the request for the second shared user content, and caching the second shared user content.

There is provided a method for instructing a Wireless Device (WD) to store a shared user content to a Content Delivery Network (CDN) Delivery and Caching Node (DCN) and to retrieve the shared user content from the CDN DCN. The method is executed by the network node and comprises receiving a request for a transfer of the shared user content from the WD, selecting a CDN DCN for storing the shared user content, sending a request for the URL to a CDN management node, receiving the URL from the CDN management node and sending a Uniform Resource Locator (URL) for the shared user content to the WD. The method comprises sending the URL to other WDs sending a subscription request to the CDN management node, to be notified with information relating to the shared user content stored in the CDN DCN, receiving a notification with the information relating to the shared user content stored in the CDN DCN, determining a new time expiry for the shared user content and sending the new time expiry to the CDN management node. The method comprises determining that the shared user content is to be retrieved and deleted from the CDN DCN, sending a request for the shared user content to the CDN DCN, receiving the shared user content from the CDN DCN and sending a request for deletion of the shared user content to the CDN management node.

There is provided a method for managing storage of shared user content in Content Delivery Network (CDN) Delivery and Caching Node (DCN). The method is executed in a CDN management node and comprises receiving a request for a Uniform Resource Locator (URL) from a network node, updating information relating to an account associated with the network node, sending the URL to the network node, receiving the URL from a CDN DCN, for authentication and authenticating the URL. The method comprises sending an authentication response to the CDN DCN, the authentication response including a time-to-live (TTL) for the shared user content and receiving a subscription request from the network node, to be notified with the information relating to the shared user content stored in the CDN DCN. The method comprises sending a notification (229, 307, 321) to the network node containing the information relating to the shared user content stored in the CDN DCN, determining to send the notification on cached shared user content, sending a request to get a list of URLs under an account to a database, sending a request to reset a time-to-live (TTL) for the shared user content to the CDN DCN, sending requests for updating the status for the shared user contents stored in the database, sending a request to get the list of URLs under an account to the database, sending a request to delete shared user content to the CDN DCN and sending a request to update the status for the shared user content to the database.

The system, Wireless Device (WD), User Equipment (UE), Content Delivery Network (CDN) Delivery and Caching Node (DCN), network node, CDN management node and methods provided herein present improvements to the way WD, UE, CDN, CDN DCN, network node, CDN management node and methods operate.

For example, a network operator can provide a new service to web application providers to cache contents uploaded by users. As a consequence, the traffic towards the content provider's origin server can be limited and better controlled.

A content provider can also manage the content uploaded from users more efficiently because it can select to store the content in a CDN or in the Content Provider's own storage (e.g. origin server).

A user can have a better user experience in uploading content since the cache of the CDN is located next to the user.

DETAILED DESCRIPTION

Various features and embodiments will now be described with reference to the figures to fully convey the scope of the disclosure to those skilled in the art.

Many aspects will be described in terms of sequences of actions or functions. It should be recognized that in some embodiments, some functions or actions could be performed by specialized circuits, by program instructions being executed by one or more processors, or by a combination of both.

Further, some embodiments can be partially or completely embodied in the form of computer-readable carrier or carrier wave containing an appropriate set of computer instructions that would cause a processor to carry out the techniques described herein.

In some alternate embodiments, the functions/actions may occur out of the order noted in the sequence of actions. Furthermore, in some illustrations, some blocks, functions or actions may be optional and may or may not be executed.

Figure 1:
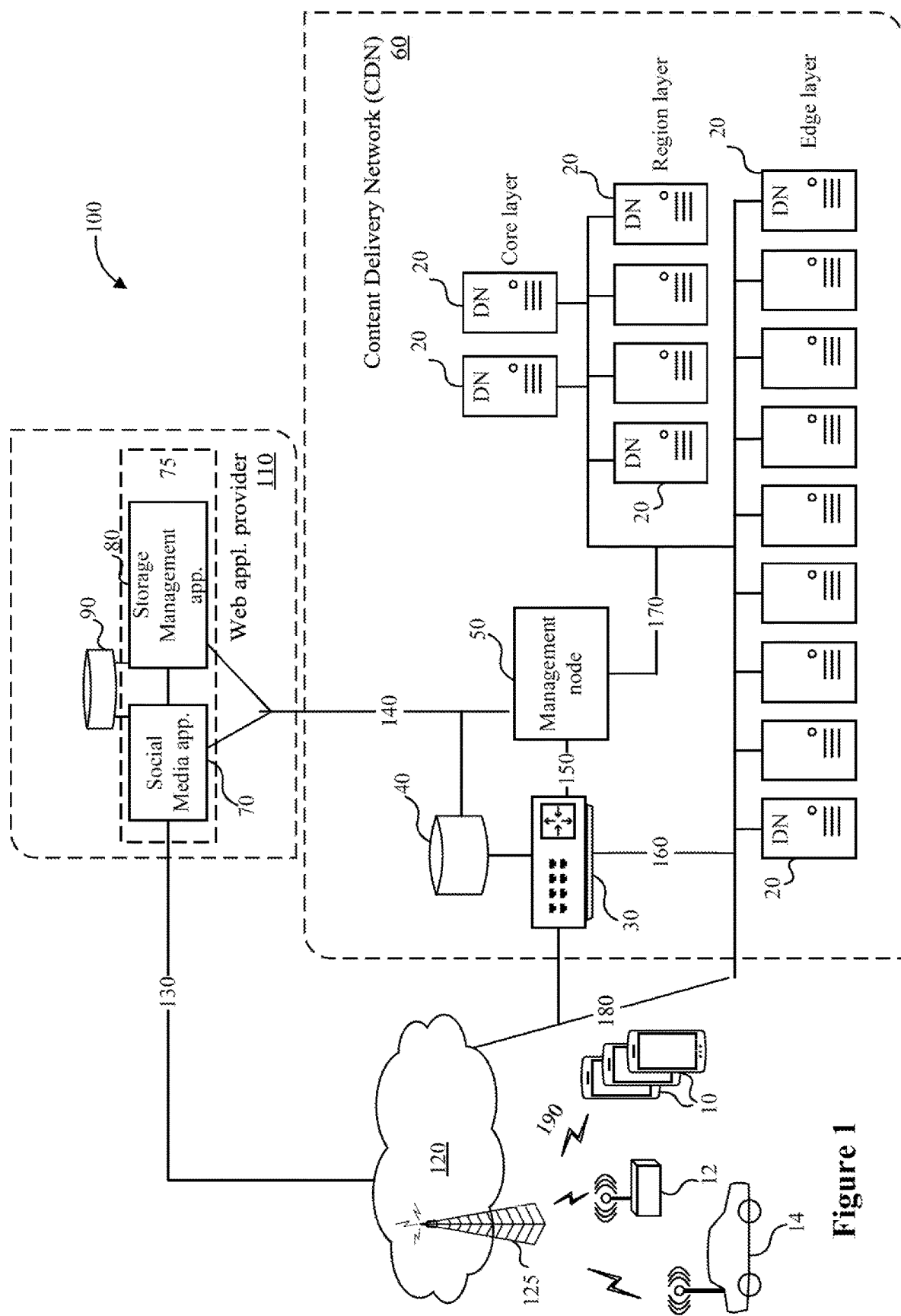
FIG. 1 a schematic illustration of a communication network according to an embodiment.

FIG. 1 illustrates a communication network 100 comprising wireless devices (WDs) 10, 12, 14, generally 10, including user equipment (UE) 10, Internet of Things (IoT) device 12 and vehicle 14. The communication network 100 also includes a 30 content delivery Network (CDN) 60 as well as a web application provider 110.

The new CDN differs from traditional CDNs in that it includes a CDN management node 50, which can be a standalone hardware node, a function collocated with another node of the CDN, such as a Delivery and Caching Node (DCN) for example or an application or a virtual appliance running in the cloud.

The CDN management node 50 provides the ability for caching content uploaded by a user directly into the CDN. The CDN management node 50 is also responsible for communicating with the web application provider 110 concerning storage management based on service-level agreement (SLA). Uniform resource locator (URL) mapping for the cached uploaded contents, set up of an expiry time and deletion of the uploaded contents in CDN is also overviewed by the CDN management node 50. It can schedule when the web application provider can retrieve the contents into its local storage, for instance, during non-peak hours. In case a lot of uploaded contents have to be transferred, the CDN management node 50 is able to send the notification for fetching uploaded contents at different time slots based upon bandwidth limitations and traffic.

Still referring to FIG. 1, the WD 10 can communicate with a network 120 through an access point 125 by sending and/or receiving wireless signals 190 containing messages or other types of data. The messages can be relayed to the web application provider 110 through a communication link 130 and be delivered, for example, to a social media application 70 which may be in communication with a storage management application 80 and physical storage 90.

It is to be noted that, for the sake of simplicity, the social media application 70 and associated steps, as well as the storage management application 80 and associated steps have been aggregated in the figures and in the methods described below as being part of the network node 75. A person skilled in the art would understand that these applications could be collocated in a single network node 75, but could also run in separate network nodes, or alternatively, one application could run in a network node and the other in the cloud or both applications could run in the cloud, and that the methods, nodes and system described below encompass each of these implementations.

The WD 10 can communicate with the CDN 60 through the access point 125 and through a communication link 180. The WD 10 can thus access a delivery and caching node 20 or a request router (RR) 30, e.g. to request for content. The RR 30 is connected to the DCNs 20 through communication link 160 and to the CDN management node 50 through communication link 150. As explained earlier, the CDN management node 50 does not have to be a standalone hardware node, it can be collocated with a DCN 20 or other CDN nodes or it can reside in the cloud.

The CDN management node 50, can communicate with the DNs 20 through communication link 170 and with the Web application provider 110 through communication link 140. DCNs can be arranged in layers (core, region and edge) as illustrated, however other configurations are possible as would be apparent to a person skilled in the art.

The CDN further comprise a database 40 for storing information such as account information for social media applications, data associated with the configuration of the CDN and DCNs, information relating to content within the DCN including content uploaded by users, policies related to accounts, etc.

Figure 2:
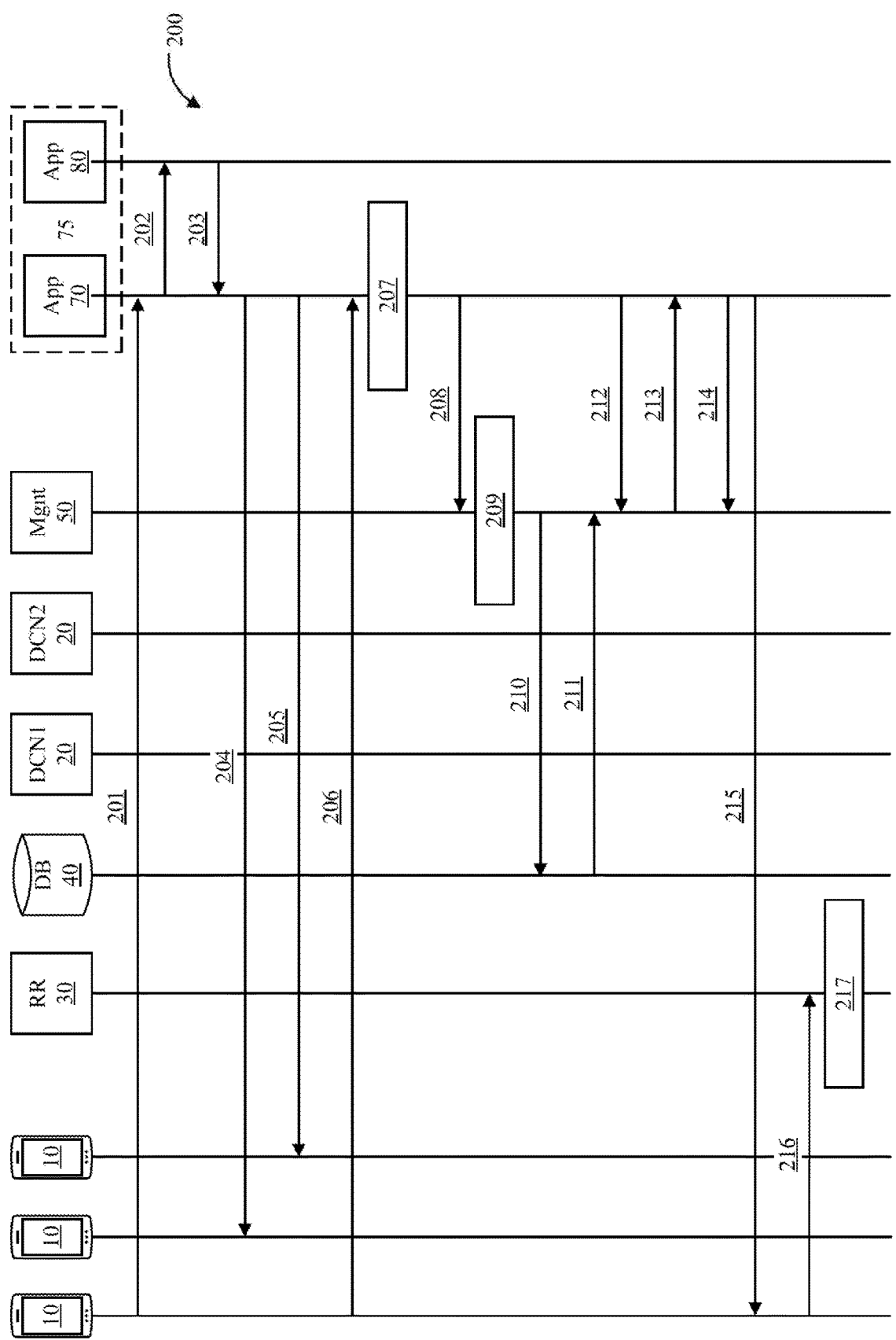
FIG. 2 is a flow diagram of a method according to an embodiment.
Figure 2:
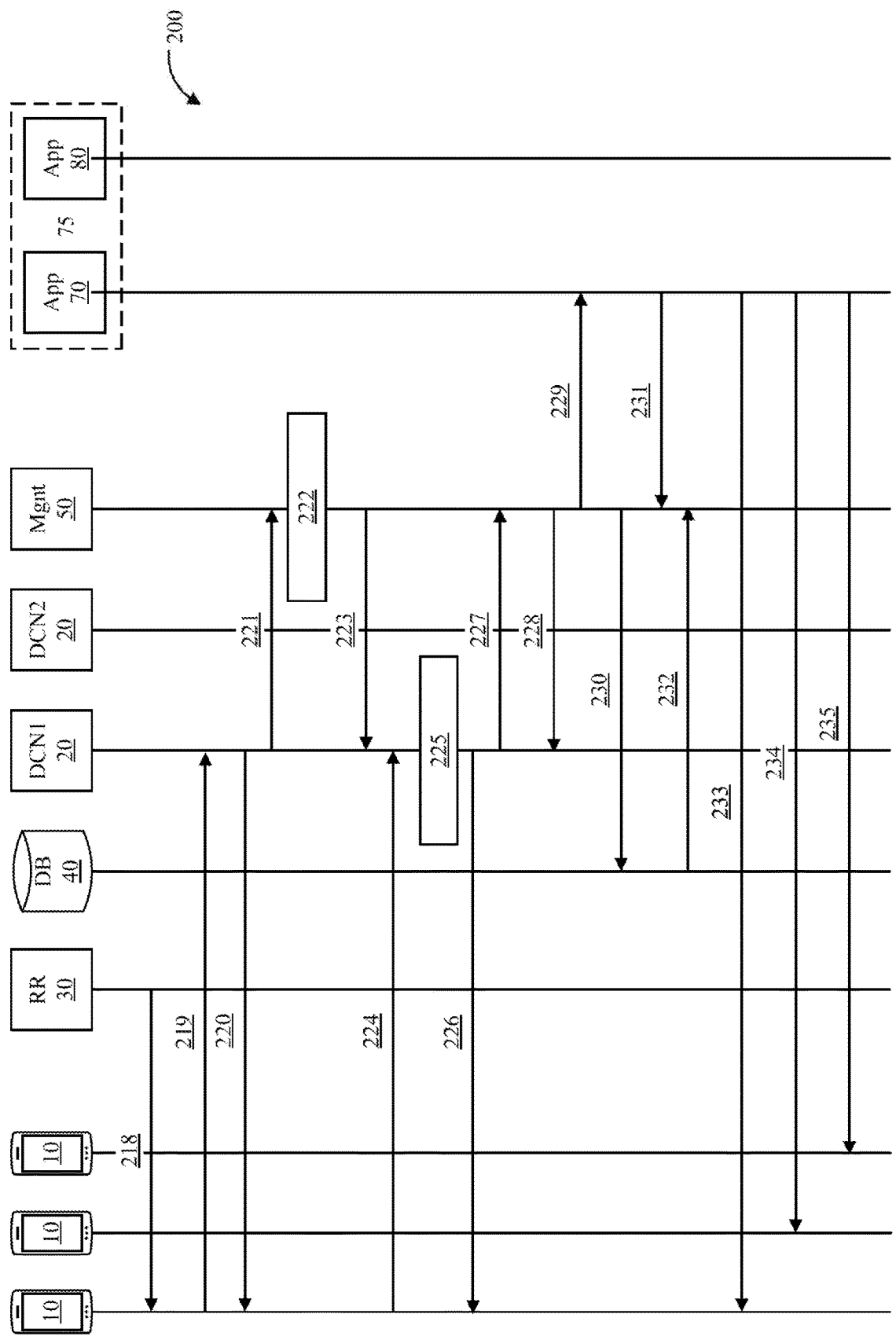

Turning to FIG. 2, there is illustrated a flow diagram 200 for uploading user content, e.g. exchanged between users during the course of a group chat in relation with a social networking application, and for caching the content in a CDN.

The flow diagram first illustrates a method for uploading a user content to be shared from a Wireless Device (WD) to a Content Delivery Network (CDN) Delivery and Caching Node (DCN), the method executed by the WD.

In this method, the WD 10 sends a message, step 201, to a network node 75 running a social network application. Then, the WD 10 sends a request, step 206, to the network node 75 for a transfer of the user content to be shared from the WD. The content may be a picture, a video or any other type of content. In step 206, the WD may send, for example, a request according to HTTP 1.1 specification. Other methods that could allow the WD to send requests and upload content could also be used as would be apparent to a person skilled in the art. For example, the WD can use HTTP POST comprising an "Expect: 100-continue" header to indicate that it will upload a large content/file to the CDN DCN, typically a media file. If the CDN is able to receive this large media file, the network node can respond with a "100-continue" message (not illustrated) and then the WD can start uploading the content. In this embodiment, the CDN DCN acts as an HTTP server and supports HTTP 1.1 to make the upload of large content/files more efficient. The WD receives a Uniform Resource Locator (URL), step 215, from the network node for the user content to be shared. The URL may be in the form of a Full Qualified Distinguished Name (FQDN) which is to be provided to the RR 30. The URL could be in any equivalent alternate form, as would be apparent to a person skilled in the art. The WD then sends a request to the request router (RR) 30, step 216. Again, the WD 10 can send an HTTP POST comprising an "Expect: 100-continue" header. The request router 30 in collaboration with the database 40 locates the CDN DCN next to the WD based on its location and/or its capability to handle large contents/files, step 217. The WD receives an address of the CDN DCN, step 218, the address may be an internet protocol (IP) address. The WD sends the URL to the CDN DCN, step 219, and receives a "100 continue" message, step 220, the "100 continue" message indicates that the CDN DCN is ready for receiving the content/file. The WD then uploads the user content to be shared, step 224, to the CDN DCN and received a 200 OK message, step 226.

The same WD or another WD can then click on the URL, steps 236, 247, which they have received at steps 233 to 235. A request to get the content is sent to the RR, steps 237 and 248. The request router 30 in collaboration with the database 40 locates the delivery node next to the WD based on its location, steps 238, 249. A redirect message is returned to the WD, steps 239, 250, which contains information to contact the DCN 20 having the requested content. The WD requests for the content, steps 240, 251. The WD receives a 200 OK message, steps 245, 256, and, using the URL, steps 246, 257, downloads the shared user content from the CDN DCN 20.

The flow diagram of FIG. 2 also illustrates a method for caching and delivering a shared user content, the method being executed by the CDN DCN. In this method, the CDN DCN receives a Uniform Resource Locator (URL) from a Wireless Device (WD), step 219, for the shared user content. The CDN DCN sends the URL to a CDN management node 50, step 221, for authentication and receives an authentication response, step 223, from the CDN management node 50. Then, the CDN DCN receives the shared user content, step 224, corresponding to the URL from the WD and caches the shared user content, step 225.

The CDN DCN can receive a request from any one of the WDs for a second shared user content, steps 240, 251, which is not cached in the CDN DCN. The CDN DCN detects that the content is not in its cache, steps 241, 252, and sends a request for the second shared user content to a second CDN DCN, steps 242, 253. The CDN DCN receives a 200 OK at steps 243, 254 and caches the second shared user content, steps 244, 255, in its cache. The CDN DCN can then send the second shared user content to the WD, step 245, 246, 256, 257, in response to the request for the second shared user content.

The flow diagram of FIG. 2 also illustrates a method for instructing a Wireless Device (WD) to store a shared user content to a Content Delivery Network (CDN) Delivery and Caching Node (DCN) and to retrieve the shared user content from the CDN DCN, the method being executed by the network node 75.

In this method, the network node 75 receives a message from a WD, step 201. The message is forwarded to other WDs at steps 204 and 205. The social media application 70 which, in one embodiment runs in the network node 75 sends the message to the storage management application 80, step 202, which in this embodiment also runs in the network node 75, and receives a success response, step 203. The network node 75 receives a request, step 206, for a transfer of the shared user content from the WD. The network node 75 selects a CDN DCN, step 207, for storing the shared user content. Selection can be based on the content size, for example. The network node sends a request for the URL, step 208, to a CDN management node 50, which locates the account and service in relation with the database 40, steps 209 to 211. The network node receives the URL, step 212, from the CDN management node 50. Then, the network node can send a subscription request to the CDN management node, step 213, to be notified with information relating to the shared user content stored in the CDN DCN, and the network node receives a 200 OK message at step 214. The network node 75 sends the URL, step 215, for the shared user content to the WD. At some point, the network node 75 received a notification with information relating to the shared user content stored in the CDN DCN from the CDN management node, step 229, and returns a 200 OK message, step 231. The network node 75 can then send the URL to other WDs, steps 233, 234, 235 for content retrieval from the CDN DCN.

Figure 3:
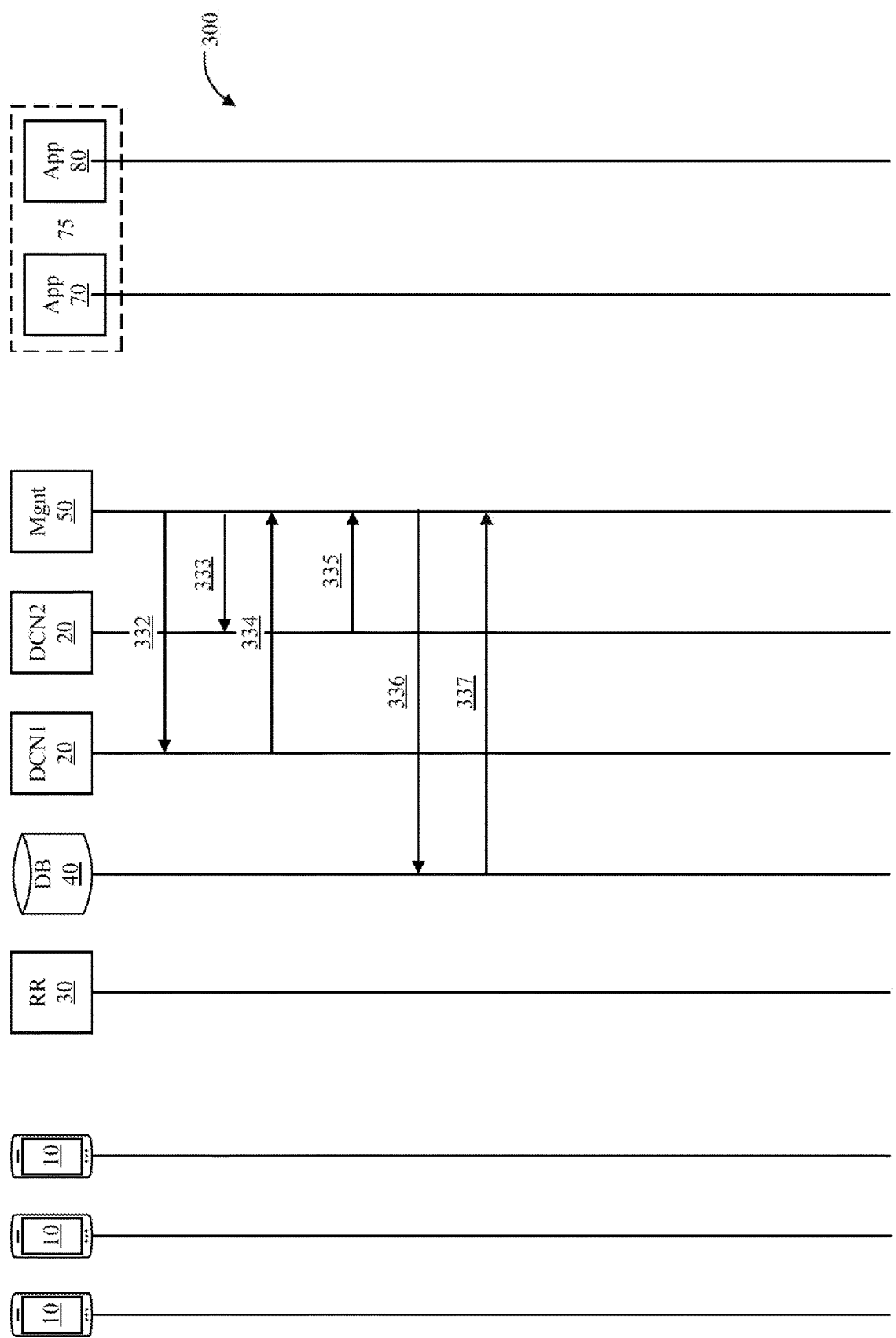
FIG. 3 is a flow diagram of a method according to another embodiment.

Turning to the flow diagram 300 of FIG. 3, the network node 75 reads the configuration based upon service-level agreement between the CDN and the web service provider, step 301. After subscribing with the CDN management node, step 302, the network node 75 receives a 200 OK message, step 303, and receives a notification with information relating to a URL or a list of URLs for shared user content(s) stored in the CDN DCN, step 307. The network node sends a 200 OK message to the CDN management node, step 308, and can determine a new time expiry, step 309, for the shared user content(s). The network node 75 sends the new time expiry, also called time-to-live, step 310, to the CDN management node and receives an acknowledgement that it is accepted, step 311.

The network node 75 receives a further notification with information relating to a URL or a list of URLs for shared user content(s) stored in the CDN DCN, step 321, from the CDN management node and sends a 200 OK message to the CDN management node, step 322. The network node 75 determines that the shared user content is to be retrieved from the CDN, step 323. The network node 75 sends a request to the content URL to the RR 30, step 324 and receives a redirect message, step 325. The network node then sends a request for the shared user content to the CDN DCN, using the URL, step 326, and receives the shared user content and a 200 OK message, step 328, from the CDN DCN. At step 327, the CDN DCN determines that the content is in its cache.

The network node 75 can then determine that the shared user content is to be deleted from the CDN DCN, step 329. The network node 75 sends a request for deletion of the shared user content, step 330, to the CDN management node and receives an acknowledgement that it is accepted, step 331.

Now returning to FIG. 2, the flow diagram also illustrates a method for managing storage of shared user content in Content Delivery Network (CDN) Delivery and Caching Node (DCN), the method being executed in a CDN management node. The CDN management node receives a request, step 208, for a Uniform Resource Locator (URL) from the network node 75 and updates information relating to an account associated with the network node by accessing information about the account and associated service, step 209, registering the shared user content (e.g. name and type of content) with the Database 40, step 210, and receiving a response from the database 40, step 211. The CDN management node 50 sends the URL to the network node, step 212 and can respond with a 200 OK message, step 214, to a subscribe request received from the network node, to be notified with information relating to the shared user content stored in the CDN DCN, step 213. The CDN management node receives the URL from a CDN DCN, step 221, for authentication and authenticates the URL at step 222.

Authentication can be done via a token, which may be generated, for example, based upon a shared secret, an IP address, the URL and an expiry time, as would be apparent to a person skilled in the art. The token can be either inserted in the path of the URL which can take different forms, as would be apparent to a person skilled in the art, for example: fqdn:port/token/TOKEN_VALUE/URL path/upload file or fqdn:port/URL path/upload file/?token="TOKEN_VALUE" or as a payload of a message transferring the URL, such as in the HTTP header as an X-Token.

The CDN management node 50 sends an authentication response, step 223, to the CDN DCN, the authentication response including a time-to-live (TTL) for the shared user content. Once the TTL is accepted, a confirmation message, step 227, is received by the CDN management node from the CDN DCN and a 200 OK response is returned, step 228. The CDN management node is further able to update the status of a shared user content with the database 40, step 230, and to receive a 200 OK message in return, step 232.

Further to that, the CDN management node can send notifications, steps 229, 307, 321, to the network node, containing information relating to the shared user content stored in the CDN DCN.

Turning to FIG. 3, the CDN management node can also determine to send a notification on cached shared user content, step 304 and to send a request to get a list of URLs under an account to the database 40, step 305. The CDN management node receives a success message in response, at step 306. When the CDN management node is requested to change (e.g. extend) the TTL for a shared user content, it may send a request to reset the TTL for the shared user content to the CDN DCN, steps 312 and 313, and receive responses, steps 314 and 315. In addition, the CDN management node can update the status for the shared user contents stored in the Database 40, step 316, and receive a response at step 317. This or another event may trigger a determination to send a notification concerning the shared user contents, step 318. In order to prepare to send a notification, the CDN management node 50 sends a request to get a list of URLs under an account to the database 40, step 319, and receives a response at step 320. It can then notify the network node 75, step 321.

Once the CDN management node receives a request to delete a shared user content, from the network node, it sends requests to delete the shared user content to the CDN DCNs, steps 332 and 333, and receives responses at steps 334 and 335. It then sends a request to update the status for the shared user content to the database 40, step 336, and receives a response at step 337.

Figure 4:
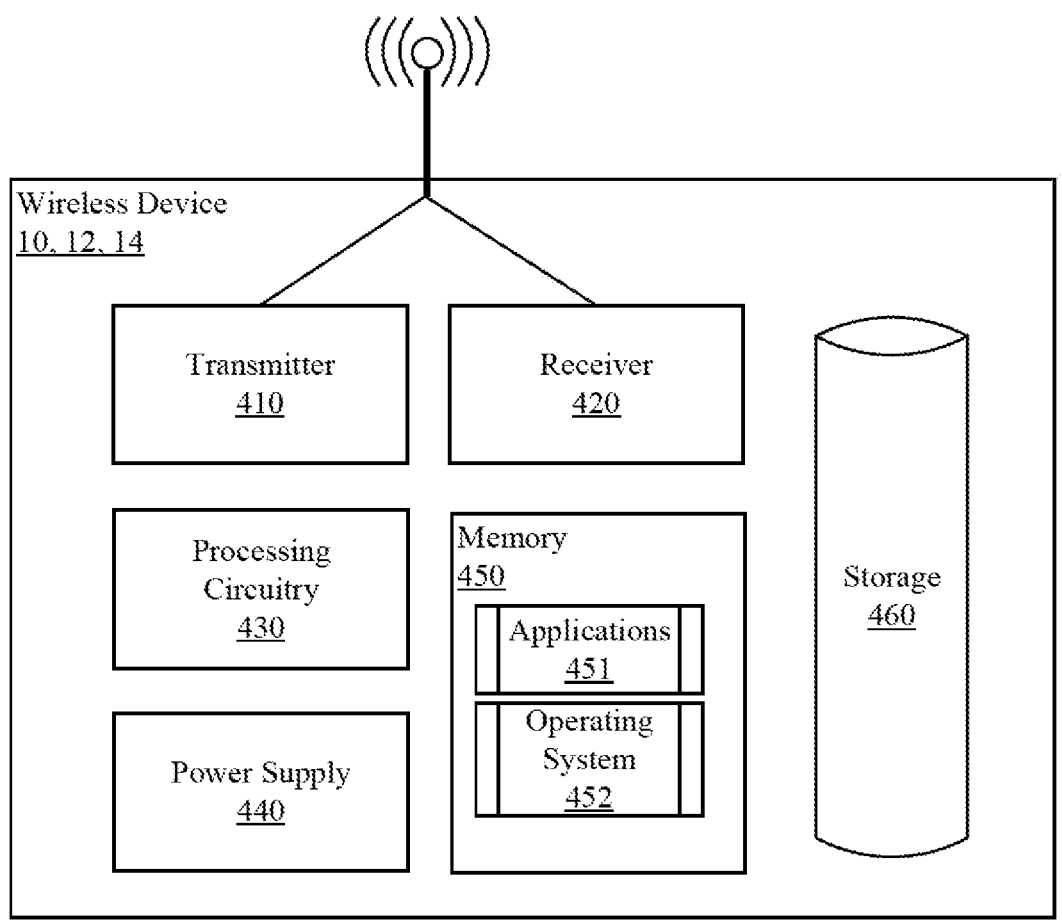
FIG. 4 is a schematic illustration of a wireless device according to an embodiment.

FIG. 4 is a block diagram of a wireless device 10, 12, 14 suitable for implementing aspects of the embodiments disclosed herein. The wireless device includes an antenna (not numbered), a transmitter 410, a receiver 420, processing circuitry 430, a memory 450 which may comprise applications 451 and an operating system 452, a storage 460 that can be in the form of a non-transitory machine readable media and a power supply 440.

The Wireless Device (WD) is operative for uploading a user content to be shared to a Content Delivery Network (CDN) Delivery and Caching Node (DCN) and comprises a transmitter 410 operative to send a request to a network node for a transfer of the user content to be shared from the WD, it also comprises a receiver 420 operative to receive a Uniform Resource Locator (URL) from the network node for the user content to be shared. The transmitter 410 is further operative to send the URL to the CDN DCN and to upload the user content to be shared to the CDN DCN. The WD also comprises power supply circuitry 440 operative to supply power to the WD. The request for a transfer of the user content to be shared may be sent to a Request Router (RR) and the receiver may further be operative to receive an address of the CDN DCN. The transmitter 410 may further be operative to contact the CDN DCN through the URL and the receiver may further be operative to download the shared user content from the CDN DCN.

In some embodiments, the WD may be a User Equipment (UE) such as a mobile phone, tablet, portable computer or other transportable or wearable device.

Figure 5:
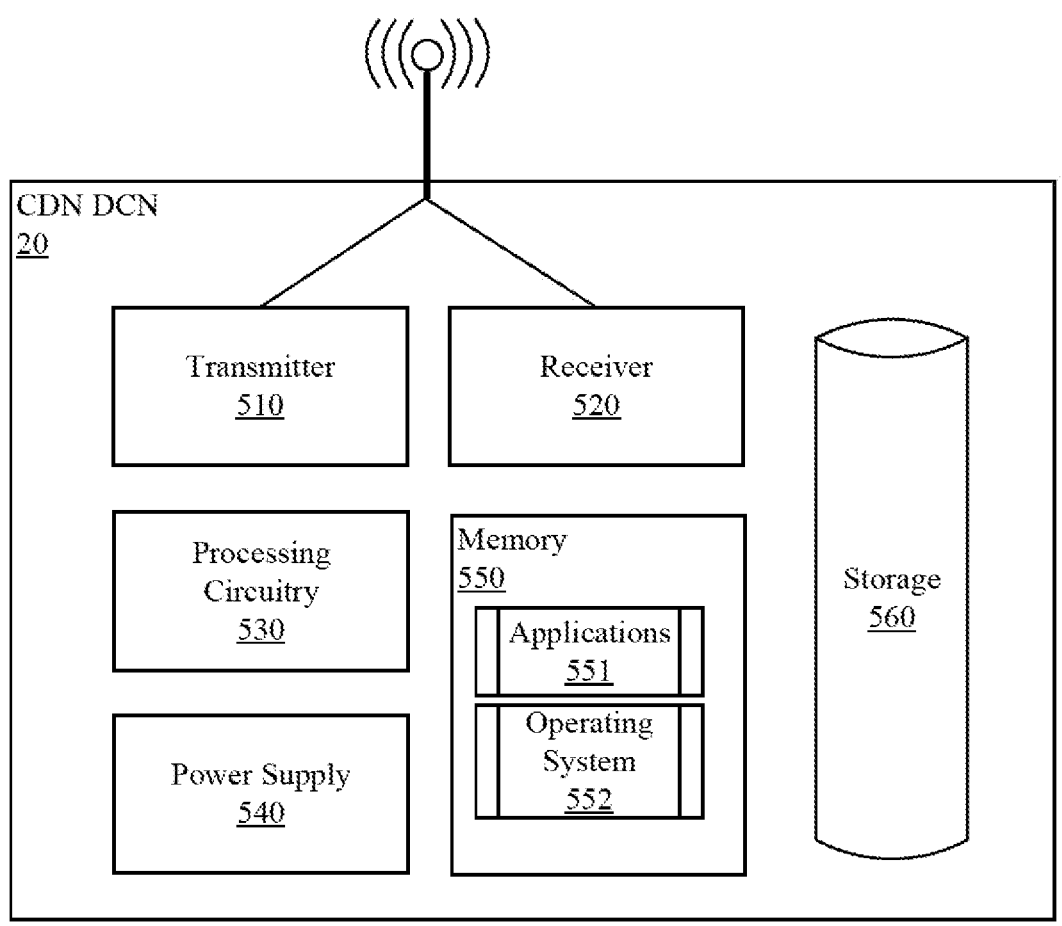
FIG. 5 is a schematic illustration of a CDN DCN according to an embodiment.

FIG. 5 is a block diagram of a CDN DCN 20 suitable for implementing aspects of the embodiments disclosed herein. The CDN DCN 20 includes an antenna (not numbered), a transmitter 510, a receiver 520, processing circuitry 530, a memory 550 which may comprise applications 551 and an operating system 552, a storage 560 that can be in the form of a non-transitory machine readable media and a power supply 540.

The Content Delivery Network (CDN) Delivery and Caching Node (DCN) is operative for caching and delivering a shared user content. The CDN DCN comprises a receiver 520 operative to receive a Uniform Resource Locator (URL) from a Wireless Device (WD) for the shared user content, it also comprises a transmitter 510 operative to send the URL to a CDN management node for authentication. The receiver 520 is further operative to receive an authentication response from the CDN management node and to receive the shared user content corresponding to the URL from the WD. The CDN DCN further comprises a storage 560 operative to cache the shared user content and power supply circuitry 540 operative to supply power to the CDN DCN. The receiver 520 of the CDN DCN 20 may be further operative to receive a request from the WD for a second shared user content which is not cached in the CDN DCN. The transmitter 510 may be further operative to send a request for the second shared user content to a second CDN DCN and to send the second shared user content to the WD in response to the request for the second shared user content. The storage of the CDN DCN may be further operative to cache the second shared user content.

Figure 6:
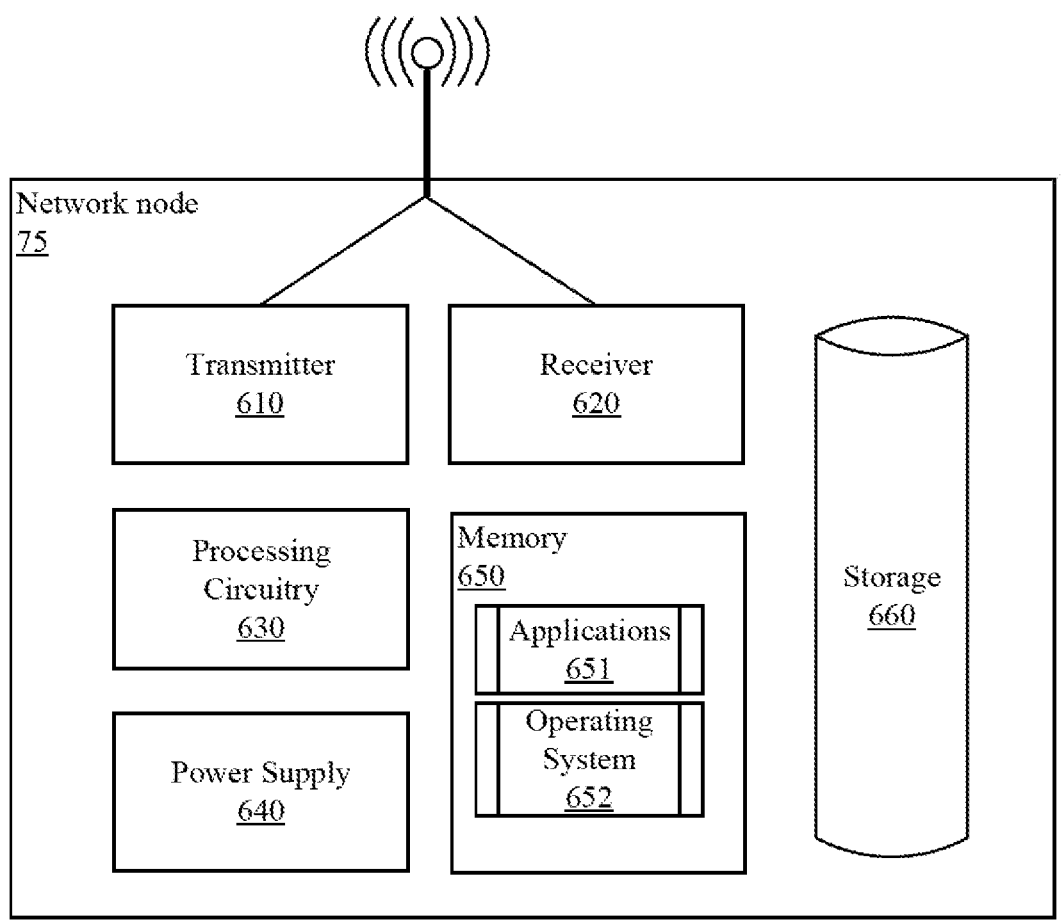
FIG. 6 is a schematic illustration of a network node according to an embodiment.

FIG. 6 is a block diagram of a hardware network node 75 suitable for implementing aspects of the embodiments disclosed herein. The network node 75 includes an antenna (not numbered), a transmitter 610, a receiver 620, processing circuitry 630, a memory 650 which may comprise applications 651 and an operating system 652, a storage 660 that can be in the form of a non-transitory machine readable media and a power supply 640. As explained previously, the network node 75 may comprise/run both the social media application as well as the storage management application, alternatively, these applications can alternatively run on separated nodes or in the cloud, as would be apparent to a person skilled in the art.

The network node 75 is operative to instruct a Wireless Device (WD) to store a shared user content to a Content Delivery Network (CDN) Delivery and Caching Node (DCN) and to retrieve the shared user content from the CDN DCN. The network node 75 comprises a receiver 620 operative to receive a request for a transfer of the shared user content from the WD, processing circuitry 630 operative to select a CDN DCN for storing the shared user content a transmitter 610 operative to send a Uniform Resource Locator (URL) for the shared user content to the WD and power supply circuitry 640 operative to supply power to the network node.

In the network node, the transmitter 610 may further be operative to send a request for the URL to a CDN management node and the receiver may further be operative to receive the URL from the CDN management node. The transmitter may further be operative to send the URL to other WDs. The transmitter may further be operative to send a subscription request to the CDN management node, to be notified with information relating to the shared user content stored in the CDN DCN.

In the network node 75 the receiver 620 may further be operative to receive a notification with information relating to the shared user content stored in the CDN DCN, the processing circuitry 630 may further be operative to determine a new time expiry for the shared user content and the transmitter 610 may further be operative to send the new time expiry to the CDN DCN.

In the network node 75 the processing circuitry 630 may further be operative to determine that the shared user content is to be retrieved and deleted from the CDN DCN, the transmitter 610 may further be operative to send a request for the shared user content to the CDN DCN and the receiver 620 may further be operative to receive the shared user content from the CDN DCN. The transmitter 610 may further be operative to send a request for deletion of the shared user content to the CDN management node.

Figure 7:
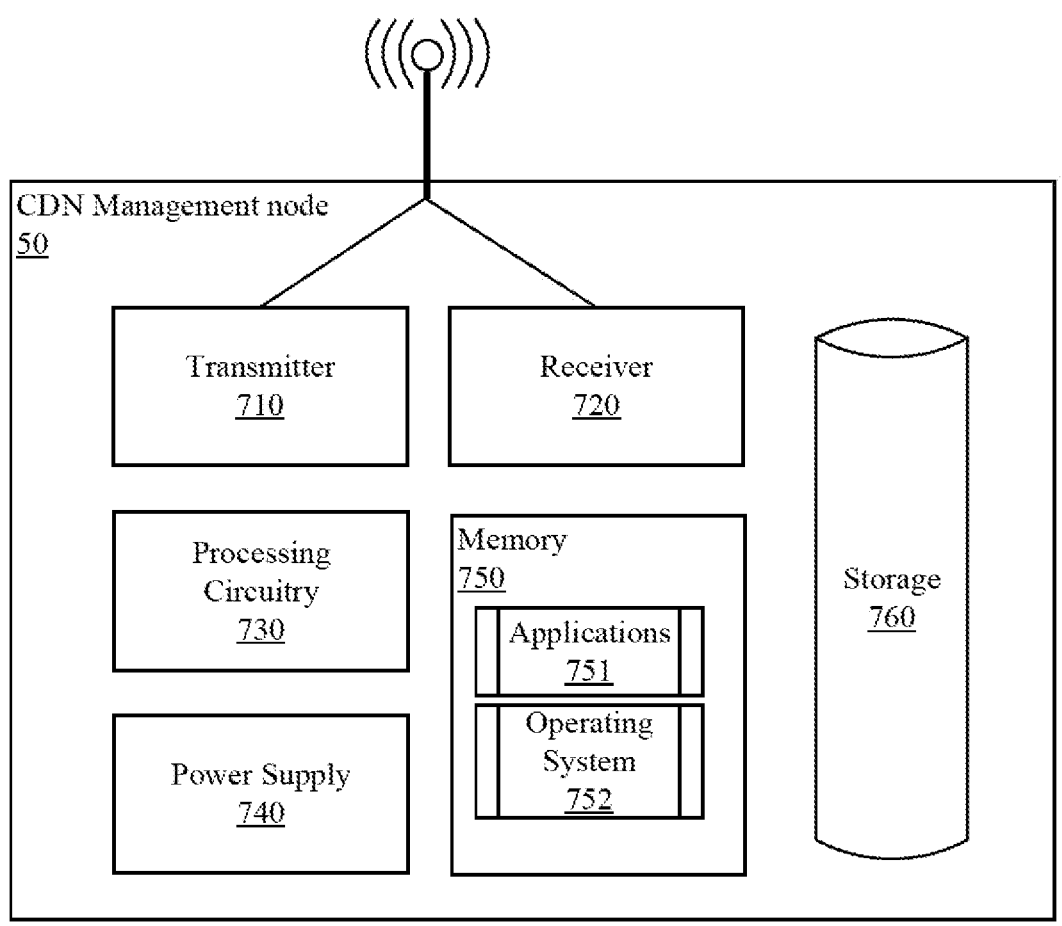
FIG. 7 is a schematic illustration of a CDN management node according to an embodiment.

FIG. 7 is a block diagram of a CDN management node 50 suitable for implementing aspects of the embodiments disclosed herein. The CDN management node 50 includes an antenna (not numbered), a transmitter 710, a receiver 720, processing circuitry 730, a memory 750 which may comprise applications 751 and an operating system 752, a storage 760 that can be in the form of a non-transitory machine readable media and a power supply 740.

The Content Delivery Network (CDN) management node 50 is operative to manage storage of shared user content in CDN Delivery and Caching Node (DCN). The CDN management node 50 comprises a receiver 720 operative to receive a request for a Uniform Resource Locator (URL) from a network node, processing circuitry 730 operative to update information relating to an account associated with the network node a transmitter 710 operative to send the URL to the network node. The receiver 720 being is further operative to receive the URL from a CDN DCN, the processing circuit 730 is further operative to authenticate the URL and the transmitter 710 is further operative to send an authentication response to the CDN DCN, the authentication response including a time-to-live (TTL) for the shared user content.

In the CDN management node 50, the receiver 720 may further be operative to receive a subscription request from the network node, to be notified with information relating to the shared user content stored in the CDN DCN and the transmitter 710 may further be operative to send a notification to the network node containing information relating to the shared user content stored in the CDN DCN.

In FIGS. 4 to 7, the receivers and transmitters generally include analog and/or digital components for sending and receiving communications to and from the different devices and nodes within a wireless coverage area. Those skilled in the art will appreciate that the block diagram of the devices and nodes necessarily omit numerous features that are not necessary for a complete understanding of this disclosure.

One embodiment of the present disclosure may be implemented as a computer program product that is stored on a computer-readable storage medium, the computer program product including programming instructions that are configured to cause the processors to carry out the steps described herein.

Returning to FIG. 1, there is illustrated a system 100 for managing a shared user content. The system comprises the WD 10, 12, 14 which is operative to upload the content to be shared to a Content Delivery Network (CDN) Delivery and Caching Node (DCN) 20, which in turn is operative to cache and deliver the shared user content to other wireless devices and network nodes. The system 100 further comprises the CDN management node 50, operative to manage the storage of the shared user content in the CDN DCN and the network node 75, operative to instruct the WD to store the shared user content to the CDN DCN and to retrieve the shared user content from the CDN DCN.

Figure 8A:
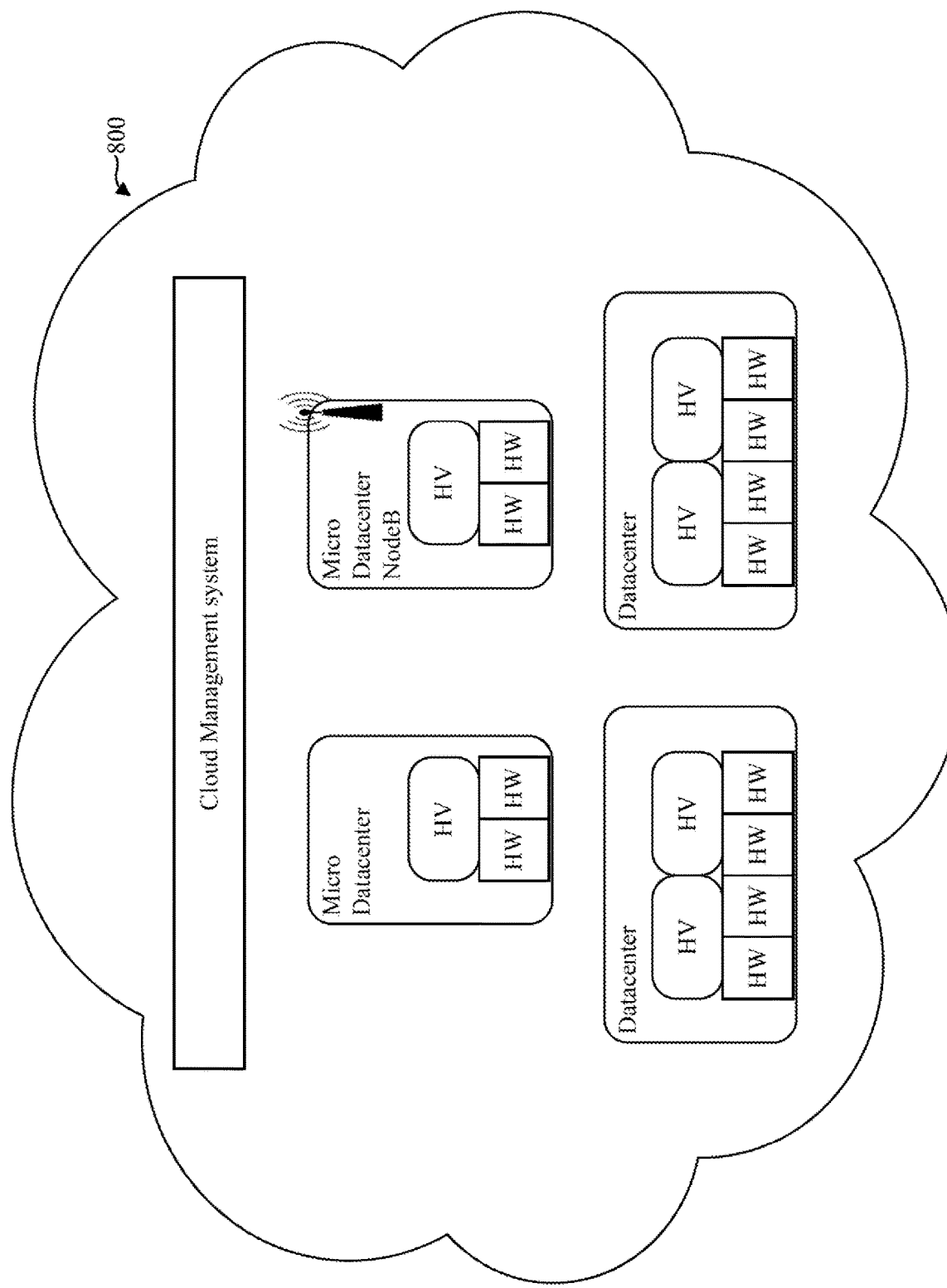
FIGS. 8a and b are schematic illustrations of a cloud environment in which embodiments can be deployed.
Figure 8B:
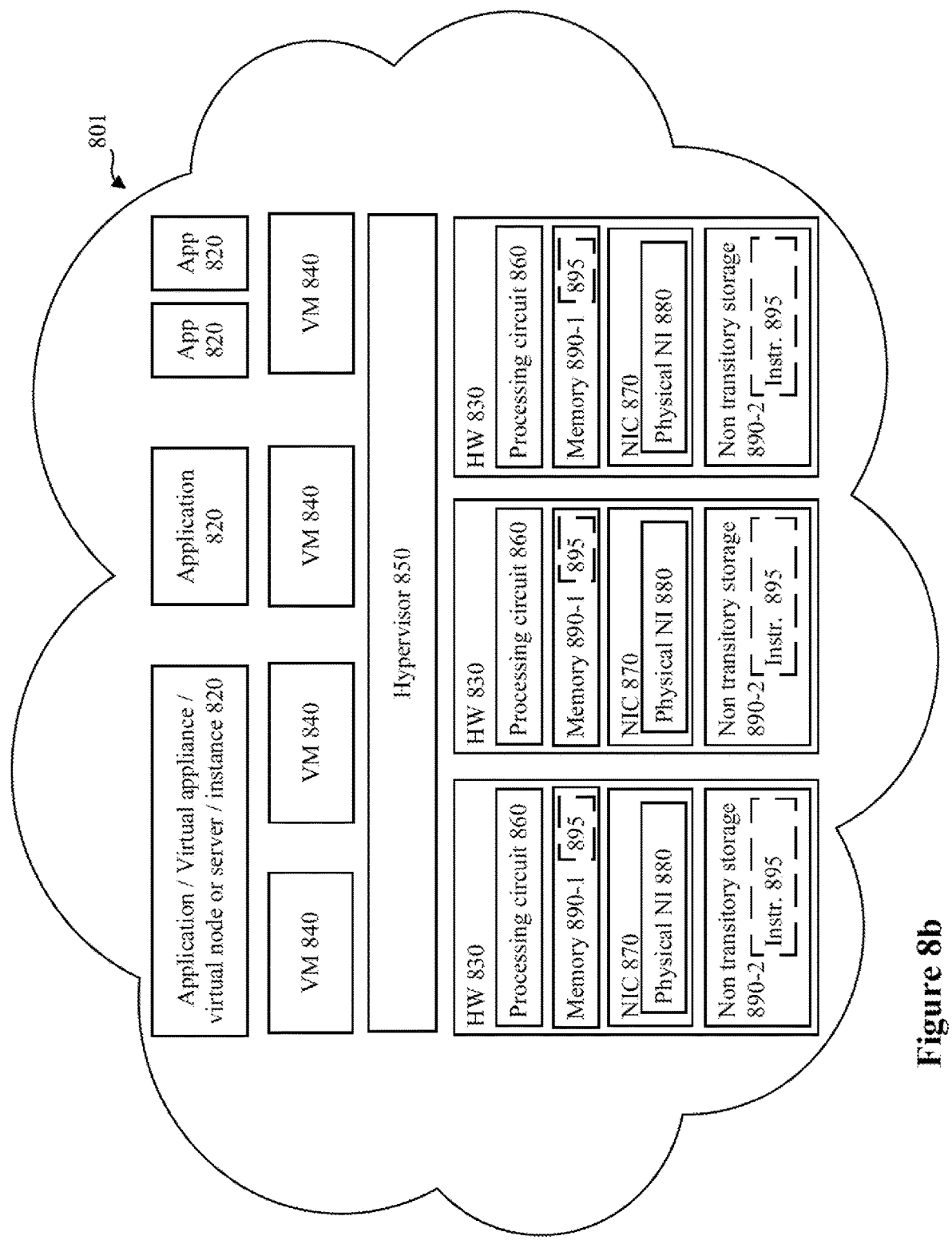

Turning to FIGS. 8a and b, at least part of this system can be implemented in the cloud 800.

According to an embodiment, there is provided device(s) and/or node(s) or virtual appliance(s) 820, in a cloud computing environment 801 which provides processing circuit 860 and memory 890 for running instances of device(s) and/or node(s) according to embodiment(s) described herein. The memory contains instructions 895 executable by the processing circuit whereby instance(s) 820 of the device(s) and/or node(s) according to embodiment(s) described herein are operative to execute the methods as previously described in relation to FIGS. 2 and 3.

The cloud computing environment 801, comprises a general-purpose network device including hardware 830 comprising a set of one or more processor(s) or processing circuits 860, which can be commercial off-the-shelf (COTS) processors, dedicated Application Specific Integrated Circuits (ASICs), or any other type of processing circuit including digital or analog hardware components or special purpose processors, and network interface controller(s) 870 (NICs), also known as network interface cards, which include physical Network Interface 880. The general-purpose network device also includes non-transitory machine readable storage media 890-2 having stored therein software 895 and/or instructions executable by the processor 860. During operation, the processor(s) 860 execute the software 895 to instantiate a hypervisor 850, sometimes referred to as a virtual machine monitor (VMM), and one or more virtual machines 840 that are run by the hypervisor 850. A virtual machine 840 is a software implementation of a physical machine that runs programs as if they were executing on a physical, non-virtualized machine; and applications generally do not know they are running on a virtual machine as opposed to running on a "bare metal" host electronic device, although some systems provide para-virtualization which allows an operating system or application to be aware of the presence of virtualization for optimization purposes. Each of the virtual machines 840, and that part of the hardware 830 that executes that virtual machine, be it hardware dedicated to that virtual machine and/or time slices of hardware temporally shared by that virtual machine with others of the virtual machine(s) 840, forms a separate virtual network element(s) (VNE).

The hypervisor 850 may present a virtual operating platform that appears like networking hardware to virtual machine 840, and the virtual machine 840 may be used to implement functionality such as control communication and configuration module(s) and forwarding table(s), this virtualization of the hardware is sometimes referred to as network function virtualization (NFV). Thus, NFV may be used to consolidate many network equipment types onto industry standard high volume server hardware, physical switches, and physical storage, which can be located in Data centers, and customer premise equipment (CPE). Different embodiments of the instance(s) of device(s) and/or node(s) according to embodiment(s) described herein may be implemented on one or more of the virtual machine(s) 840, and the implementations may be made differently.

Modifications and other embodiments will come to mind to one skilled in the art having the benefit of the teachings presented in the foregoing description and the associated drawings. Therefore, it is to be understood that modifications and other embodiments, such as specific forms other than those of the embodiments described above, are intended to be included within the scope of this disclosure. The described embodiments are merely illustrative and should not be considered restrictive in any way. The scope sought is given by the appended claims, rather than the preceding description, and all variations and equivalents that fall within the range of the claims are intended to be embraced therein. Although specific terms may be employed herein, they are used in a generic and descriptive sense only and not for purposes of limitation.

The invention claimed is:

1. A wireless device (WD) (10, 12, 14) for uploading a user content to be shared to a Content Delivery Network (CDN) Delivery and Caching Node (DCN) (20), the WD (10, 12, 14) comprising:
   a transmitter (410) operative to send a request to an application provider network node (75) for a transfer of the user content to be shared from the WD (10, 12, 14);
   a receiver (420) operative to receive a Uniform Resource Locator (URL) for the user content to be shared from the application provider network node (75);
   the transmitter (410) being further operative to send the URL for the user content to be shared to a Request Router (RR) (30);
   the receiver (420) being further operative to receive, from the RR (30), an address of the CDN DCN (20), the CDN DCN (20) being located in proximity to the WD (10, 12, 14);
   the transmitter (410) being further operative to send the URL for the user content to be shared to the CDN DCN (20) and to upload the user content to be shared to the CDN DCN (20); and
   power supply circuitry (440) operative to supply power to the WD (10, 12, 14); wherein the URL was authenticated by a Content Delivery Network (CDN) management node (50) and the CDN management node has sent an authentication response to the CDN DCN (20) including a time-to-live (TTL) for the content to be shared.

2. The WD (10, 12, 14) of claim 1, wherein:
   the transmitter (410) is further operative to request the shared user content from the CDN DCN (20) through the URL; and
   the receiver (420) is further operative to receive the shared user content from the CDN DCN (20).

3. The WD (10, 12, 14) of claim 1, wherein the WD (10, 12, 14) is a User Equipment (UE) (10).

4. A Content Delivery Network (CDN) management node (50), operative to manage storage of shared user content in CDN Delivery and Caching Node (DCN), the CDN management node (50) comprising:
   a receiver (720) operative to receive a request for a Uniform Resource Locator (URL) from an application provider network node (75);

processing circuitry (730) operative to update information relating to an account associated with the application provider network node (75);

a transmitter (710) operative to send the URL to the application provider network node (75);

the receiver (720) being further operative to receive the URL from a CDN DCN (20);

the processing circuitry (730) being further operative to authenticate the URL; and the transmitter (710) being further operative to send an authentication response to the CDN DCN (20), the authentication response including a time-to-live (TTL) for the shared user content.

5. The Content Delivery Network (CDN) management node (50) of claim 4, wherein:

the receiver (720) is further operative to receive a subscription request from the application provider network node (75), to be notified with information relating to the shared user content stored in the CDN DCN (20); and the transmitter (710) is further operative to send a notification to the application provider network node (75) containing the information relating to the shared user content stored in the CDN DCN (20).

6. A method executed by wireless device (WD) (10, 12, 14) for uploading a user content to be shared to a Content Delivery Network (CDN) Delivery and Caching Node (DCN) (20), comprising:

sending a request to an application provider network node (75) for a transfer of the user content to be shared from the WD (10, 12, 14);

receiving a Uniform Resource Locator (URL) for the user content to be shared from the application provider network node (75);

sending the URL for the user content to be shared to a Request Router (RR);

receiving, from the RR, an address of the CDN DCN (20), the CDN DCN (20) being located in proximity to the WD (10, 12, 14); and sending the URL for the user content to be shared to the CDN DCN (20) and uploading the user content to be shared to the CDN DCN (20);

wherein the URL was authenticated by a Content Delivery Network (CDN) management node (50) and the CDN management node has sent an authentication response to the CDN DCN (20) including a time-to-live (TTL) for the content to be shared.

7. The method of claim 6, further comprising:

requesting the shared user content from the CDN DCN (20) through the URL; and receiving the shared user content from the CDN DCN (20).

8. The method of claim 6, wherein the WD (10, 12, 14) is a User Equipment (UE) (10).

* * * * *